United States Patent Office 3,560,075
Patented Feb. 2, 1971

3,560,075
ORIENTED POLYMER MICROCRYSTALLINE
LIGHT POLARIZING STRUCTURES
Orlando A. Battista, Yardley, Pa., and Mamerto M. Cruz, Jr., Pennington, N.J., assignors to FMC Corporation, Philadelphia, Pa., a corporation of Delaware
Filed Mar. 24, 1967, Ser. No. 625,815
Int. Cl. G02b 5/30
U.S. Cl. 350—147
10 Claims

ABSTRACT OF THE DISCLOSURE

Light polarizing refracting structures are formed from dispersions of anisotropic organic and inorganic polymer microcrystals, the polymers having a crystalline-amorphous morphological structure. The microcrystals are dispersed in a non-solvent liquid medium which may include a dissolved polymer and the dispersion spread or cast into sheet form. The microcrystals are oriented and the liquid is then volatilized to form a film of the microcrystals or to form a polymer sheet containing the dispersed, oriented microcrystals.

---

This invention relates to new polarizing refracting structures and more particularly to such polarizing structures formed from dispersions of anisotropic polymer microcrystals.

Polarizing refracting structures are well known, perhaps the most common form consisting of iodine compounds or complexes suspended in a suitable carrier generally a thermoplastic polymer or resin. During the formation of the body, the iodine compounds are dispersed in the thermoplastic, such as a cellulose acetate or cellulose nitrate solution and the crystals of the iodine compound are oriented during the setting of the plastic. The plastic, if in sheet form, may be sufficiently thick to permit its use directly or the plastic may be secured to a more sturdy base or sandwiched between two transparent sheets such as glass, cellulose triacetate or cellulose acetate butyrate. In forming film stock or print stock for stereoscopic projection and viewing, a pair of films containing oriented crystals are generally secured to opposite faces of a transparent film such as a cellulose ester film, the two polarizing films being so arranged that the orientation of the crystals in one layer is at 90° to the direction of orientation of the crystals in the other layer.

The general purpose of the present invention is to provide an improved polarizing structure comprising anisotropic polymer microcrystals.

One of the specific advantages of the present invention is the ability to form the polarizing body or structure from a dispersion of the polymer microcrystals in a suitable liquid which is subsequently removed, as by volatilization. Accordingly, it is not essential that the polymer microcrystals be dispersed in a film-forming material and the dispersion of the polymer microcrystals is capable of forming a self-adherent coating on a supporting base.

Other objects and advantages of the invention will become apparent from the description and the accompanying drawings wherein.

Figure 1:
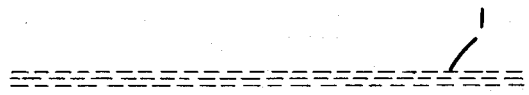
FIG. 1 is a diagrammatic illustration of a film or coating of polymer microcrystals.

Commercially available polarizing structures such as sheets or films generally consist of a plastic sheet containing iodine compound or iodine complex crystals which are oriented during the setting of the plastic by means such as an electromagnetic field, stretching of the sheet or by other mechanical means. A certain degree of polarization can be obtained by forming a thin sheet of a high molecular weight polymer and the polymer molecules may be oriented as by stretching the film.

In accordance with the present invention, a film of anisotropic polymer microcrystals is formed by drying a dispersion of the microcrystals in a suitable liquid medium or by dispersing the microcrystals in a binder matrix and forming a film from such dispersion.

In general, the polymer microcrystals are formed by partially degrading a high molecular weight polymer and subjecting the degraded material to mechanical disintegration or attrition so as to free the microcrystals. During the degrading step, certain amounts of the material may be dissolved and/or removed and the polymer chains which extend through regions of high order and regions of low order become severed or cut in the regions of low order or the so-called amorphous regions. The removal of some of the amorphous material and the cutting of polymer chains permits the partially degraded polymer to be reduced to microcrystalline and colloidal sizes by mechanical disintegration or attrition.

The organic and inorganic polymers useful in the present invention are characterized by having a crystalline-amorphous network or morphological structure consisting of regions of a high order usually termed "crystalline" and regions of low order usually termed "amorphous." In this type structure, primary polymer chains extend through a series of microcrystals connecting them by amorphous regions or hinges. Examples of polymers which are satisfactory for the purposes of the present invention include cellulose, cellulose derivatives, amylose, polysaccharides, alginates, proteins, collagen, polyamides, chitin, polyesters, polyolefins, etc. Inorganic polymers are also satisfactory provided that they possess the morphological structure as described herein. For example, microcrystalline mineral silicates derived from chrysotile asbestos as described in copending application Ser. No. 436,304, filed Mar. 1, 1965, now abandoned, is equally satisfactory.

The microcrystals of the polymers generally are rod-like in shape and have diameters of the order of 50 A. and lengths of under 1 micron. The specific dimensions will vary with the different polymers and will vary with different molecular weights of a single polymer. For example, microcrystals of cellulose derived from wood pulps have lengths considerably greater than microcrystals of cellulose derived from a regenerated cellulose. Accordingly, the microcrystals for use in any specific application may be selected from a wide range of substances so as to provide particles having one dimension shorter than the wave length or wave lengths of the light used. Polarizing refractory bodies or structures can thus be prepared for radiation ranging from ultraviolet radiation which varies from about 400 A. to about 4000 A. through the visible spectrum which varies from about 4000 A. to about 7000 A. and through the infrared spectrum which extends from about 7000 A. to about 1000 microns. Also, by a selection of microcrystals of different dimensions either of a single polymer or of different polymer, it is possible to provide a polarizing body or structure effective for two different ranges within the broad radiation spectrum.

The microcrystalline material may also be selected to serve as a fixation agent for desired dichroic dyes. Substances such as chitin and microcrystalline collagen contain basic amino groups and certain of the palyamides may be selected which also contain basic amino groups in the polymer chain. These substances, accordingly, may serve as fixation agents for acid type dyes. Microcrystalline cellulose and microcrystalline cellulose derivatives as well as other polysaccharides may serve as fixation agents for direct cotton type dyes. The microcrystalline mineral silicates as derived from chrysotile asbestos serve as a fixation agent for both types of dyes. Accordingly, the structures of this invention are satisfactory to accept dichroic dye images for stereoscopic films and prints.

The polarizing body or structure may consist of a self-supporting film 1 of the microcrystals as illustrated in FIG. 1. Such film is prepared by applying a dispersion or gel of the microcrystals in a suitable liquid medium to an inert base such as, for example, polyeterafluoroethylene and polymonochlorotrifluoroethylene and volatilizing the liquid medium. One of the characteristics of the microcrystals is their ability to bond to each other when a dispersion is dried. The physical properties of the film produced in this manner will vary depending upon the average particle size and will vary from polymer to polymer. For example, in the case of the microcrystalline cellulose films, the film may vary from a clear transparent film to a cloudy and opaque film depending upon the average particle size of the microcrystals. In general, the smaller the particle sizes, the clearer the film. Also, the flexibility of the film will vary inversely with the average particle size. Microcrystalline collagen forms a film which is a better self-supporting film in that it is of higher strength and is more flexible than a film formed of microcrystalline cellulose, assuming that the average particle size of both materials is about the same.

Figure 2:
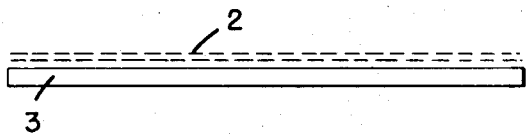
FIG. 2 is a diagrammatic illustration illustrating a self-adherent coating or film of polymer microcrystals on a supporting base.

In most instances, it is desirable to apply the microcrystalline polymer film 2 to a supporting base 3 as illustrated in FIG. 2. One of the characteristics of the microcrystalline polymers is that dispersions when applied to various surfaces, such as, for example, regenerated cellulose films and glass, form a self-adherent coating on the surface when the liquid medium is volatilized. Accordingly, to provide a more sturdy structure, the microcrystalline polymer dispersion may be applied to a glass-supporting member or a regenerated cellulose film and the coating dried as described hereinbefore. For example, in the case of microcrystalline cellulose and microcrystalline topochemical cellulose derivatives, any transparent polymer may be used as a supporting base providing the polymer has free polar groups along the polymer chain and is capable of absorbing at least 0.5% moisture when maintained for 24 hours at 75° F. in an atmosphere having a relative humidity of 100%. A wide variety of supporting bases may be utilized depending upon the specific microcrystalline polymer. For example, other satisfactory supporting bases include films of cellulose acetate, gelatin, polyamides, polyesters and various vinyl compounds such as polyvinyl alcohol.

Figure 3:
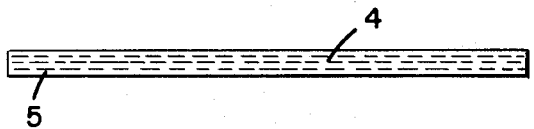
FIG. 3 is a diagrammatic illustration illustrating the polymer microcrystals suspended in a supporting base.

Alternatively, the microcrystals 4 may be dispersed in a transparent binder matrix supporting base 5 as illustrated in FIG. 3. For example, a dispersion of the microcrystalline polymer in a liquid medium may be mixed with a solution of a binder matrix such as a resin or plastic and, after thoroughly mixing to obtain a uniform distribution of the microcrystals throughout the liquid, the mixture is cast into sheet or other desired form and the solvent is volatilized. Thus, an aqueous dispersion of microcrystalline cellulose may be mixed with an aqueous solution of polyvinyl alcohol, for example, and the mixture cast to form a film.

In view of the non-Newtonian nature of the microcrystalline gel systems, some measure of orientation of the particles is obtained when the films are produced from the dispersions. However, in certain instances, it may be desirable to enhance the degree of orientation of a specific microcrystalline material for specific purposes. In such instances, higher degrees of orientation may be effected by additional means, such as by drying or setting the dispersion in a magnetic field, or the orientation, for example, in the case of a plastic film containing the dispersed particles, as illustrated in FIG. 3, may be effected by stretching of the film.

Figure 4:
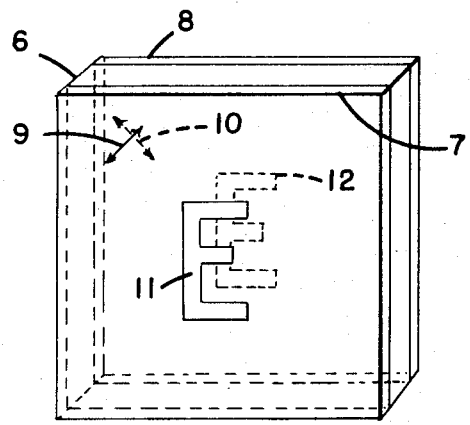
FIG. 4 is a diagrammatic perspective view of a stereoscopic print made in accordance with the present invention.

FIG. 4 illustrates a form of film stock formed of a suitable transparent supporting sheet 6 both faces of which carry a polarizing film 7 and 8 formed as described in connection with FIGS. 1, 2 and 3. As illustrated in FIG. 4, the direction of orientation of the microcrystals in the two facing films or coatings are at an angle to each other as indicated by the arrows 9 and 10. Since the microcrystals are capable of accepting dichroic dyes, each of the coating layers will be provided with a desired image 11 and 12 and specific dye.

Microcrystalline cellulose may be prepared in accordance with U.S. Pat. No. 2,978,446, dated Apr. 4, 1961. Similarly, water-insoluble polysaccharide derivatives such as, for example, microcrystalline topochemical cellulose ethers and microcrystalline topochemical organic acid esters of cellulose may be prepared in accordance with Pat. No. 3,251,824, dated May 17, 1966. Briefly, these methods involve treatment of the cellulose or cellulose derivative with an acid preferably a mineral acid such as hydrochloric acid to remove some of the amorphous cellulose and to cut or sever cellulose chains in the amorphous regions. The resulting partially degraded cellulose or cellulose derivative is then subjected to sufficient mechanical disintegration so as to free the microcrystals.

Oxidation derivatives of the microcrystalline cellulose satisfactory for the purposes of the present invention may be prepared by the methods as disclosed in U.S. Pat. No. 3,111,513, dated Nov. 19, 1963. As discussed in this patent, various specific types of oxidation derivatives may be prepared by utilizing various specific oxidizing agents.

Microcrystalline protein materials may be prepared from substances such as feathers, silk, casein, etc. by a partial degration followed by mechanical distintegration or attrition as disclosed in U.S. application Ser. No. 592,717, filed Nov. 8, 1966 now abandoned. Microcrystalline collagen is also satisfactory and may be prepared in accordance with U.S. application Ser. No. 586,969, filed Oct. 17, 1966. In the methods of treating these animal substances, the raw material is treated with solutions of ionizable acids under closely controlled conditions of concentration, temperature and time so that the disintegrated microcrystalline material although it is termed herein "microcrystalline proteinaceous materials" the microcrystals are in reality an ionizable salt of the protein.

Microcrystalline synthetic polyamides may be prepared in accordance with U.S. Pat. No. 3,299,011, dated Jan. 17, 1967 and U.S. application Ser. No. 608,508, filed Jan. 11, 1967. The general method involves a partial degradation of the polyamide followed by mechanical attrition.

Microcrystalline mineral silicates are prepared by an acid treatment of the chrysotile asbestos followed by mechanical attrition. The microcrystalline mineral silicates have a ratio MgO to $SiO_2$ of about 1:1.06 to about 1:1.30, by weight. The method is described in U.S. application Ser. No. 436,304, filed Mar. 1, 1965 now abandoned.

Microcrystals of other inorganic and organic polymers having the necessary morphological structure may be prepared by similar methods, namely, by a method whereby some of the amorphous material is removed and the molecular chains are cut or severed or weakened in the amorphous regions so that upon subsequent mechanical disintegration or attrition the microcrystals may be peeled or broken from the larger crystallite aggregates.

It is know that the radiation which is arrested or blocked by the specific microcrystals is dependent upon the size of the microcrystals. A simple and convenient method which may be used for evaluating the various refracting bodies is by utilization of the commercially available "Polaroid" Polarization Demonstrator. This device consists of two rings each having mounted therein a conventional polarizing sheet. The rings are indexed and when the two rings are positioned one over the other with the indices in register with each other all light passes through but the intensity is substantially reduced. As one ring is rotated with respect to the other ring so that the indices are at right angles to each other, no light passes through. In examing refracting films, the film is interposed between the two rings and one ring is rotated with respect to the other. It will be found that refracting films will permit certain radiation or certain bands of radiation to pass through the assembly at various relative rotational positions of the one ring with respect to the stationary or fixed ring. The radiation passing through the assembly will be dependent upon the width of the specific microcrystals in the refracting film. This method was used in the evaluation of various refracting structures formed in accordance with the present invention and also where combinations of refracting films having different microcrystalline materials were combined.

In the examples which follow, the microcrystalline products were prepared in accordance with the methods described in the aforementioned patents and applications. Gelatin and certain commercially available tropocollagen products were utilized for comparative purposes. The evaluation method described above will be designated as an examination between "crossed Polaroids."

EXAMPLE I

A high grade gelatin film having a thickness of approximately 6 mils when examined between crossed "Polaroids" showed a total extinction of light. This film is commercially available and is marketed by the Upjohn Company as "Asorbable Gelatin Film." Similarly, a film made from swollen collagen fibers having a thickness of approximately 4 mils also showed a total extinction when examined between crossed "Polaroids." A plasticized cross-linked collagen film of approximately 4 mils when examined between cross "Polaroids" allowed an orange colored light to pass through the assembly but other colors were blocked out.

EXAMPLE II

A regenerated cellulose film was prepared from a conventional viscose to which had been added 9.5% microcrystalline cellulose, based on the weight of the film. At least 85% of the microcrystalline cellulose had a particle size not exceeding 44 microns and not over 3% had a particle size exceeding 74 microns. This film when placed between the cross "Polaroids" allowed orange colored light to pass through but blocked out other colors similar to the plasticized tropocollagen film.

EXAMPLE III

An aqueous dispersion containing 6% of a microcrystalline topochemical carboxymethyl derivative of cellulose (D.S. —0.25) was cast onto a glass plate to form a dried film of approximately 2 mil thickness. During the drying of the dispersion, the plate was maintained in a strong magnetic field. This film when placed between crossed "Polaroids" permitted a band to pass through varying from blue to a yellowish green but did not show a complete extinction of light.

EXAMPLE IV

Microcrystalline collagen was prepared from bovine collagen treated with hydrochloric acid and subsequently disintegrated in the dilute acid solution. A 1% dispersion was cast on a polyethyleneterephthalate film to form a dry microcrystalline collagen film having a thickness of approximately 4 mils. When examined between crossed "Polaroids," the film allowed a band of light to pass varying from yellow to a bluish green and showed a complete extinction of all other colors.

EXAMPLE V

A high grade microcrystalline collagen was prepared by treating bovine collagen with a hydrochloric acid-isopropanol solution and disintegrating the treated collagen to form a 1% solids gel. The gel was cast on a polyethyleneterephthalate film and the dried microcrystalline cellulose film had a thickness of approsimately 2 mils. When placed between crossed "Polaroids," it allowed a band of light varying from yellow to bluish green to pass through but the extinction of other colors was not as complete as that obtained with the microcrystalline collagen film of Example IV.

EXAMPLE VI

A mixture of equal parts of microcrystalline collagen as prepared in Example IV and microcrystalline cellulose was prepared to form a gel having a 2% solids concentration. The gel was cast on a polyethyleneterephthalate film and the dried coating had a thickness of approximately 2 mils. When placed between the crossed "Polaroids," the film passed a dark bluish green but exhibited the greatest extinction of other colors of any of the films of the examples.

EXAMPLE VII

A 2% solids dispersion was prepared containing equal parts of microcrystalline collagen as described in Example IV and a microcrystalline amylose product prepared in accordance with the method described in U.S. Patent No. 3,351,489. In this instance, a commercial amylose was treated with 0.03 N·HCl at reflux temperature for 45 minutes followed by neutralization, washing and attrition. The dispersion was cast on a polyethyleneterephthalate film to form a dry coating of approximately 2 mil thickness. When examined by crossed "Polaroids," the film passed a band of light from blue to a yellowish green. There was a substantial extinction of other colors but not a complete extinction.

EXAMPLE VIII

A plasticized cross-linked collagen film and a film of microcrystalline collagen and microcrystalline cellulose as described in Example VI were placed together between crossed "Polaroids." This combination of films passed light in a band from orange to bluish green with a fair extinction of other colors.

EXAMPLE IX

A film made from swollen collagen fibers as described in Example I, a film of the microcrystalline collagen of Example IV, a film of the microcrystalline collagen and microcrystalline cellulose of Example VI were assembled on a clear cellophane sheet. The combination when examined between crossed "Polaroids" allowed a bluish green light to pass through with a fair extinction of all other colors.

EXAMPLE X

Microcrystalline amylose was prepared from a commercial amylose product containing 95% amylose by the method as described in Example VII. A 2% microcrystalline amylose dispersion in water was cast on a polyethyleneterephthalate film and dried. The coating was approximately 4 mils in thickness. This mircocrystalline amylose film had a purple cast and when examined between the crossed "Polaroids" the film passed a light red color but completely extinguished all other colors.

EXAMPLE XI

An iodine complex film was formed to demonstrate dichroism. A purified bovine collagen was treated with a water-isopropanol solution of hydriotic acid to form an iodine salt of collagen. A slurry of 233 parts of water and 100 parts of the purified collagen in finely shredded form was mixed with 675 parts of isopropanol and 12.7 parts of a 58% solution of HI in water. The resulting slurry was mixed in a Hobart mixer for about 15 minutes and then transferred to a centrifuge and a wet cake recovered amounting to about 330 parts. The cake was then mixed with 675 parts of isopropanol and mixed for about 10 minutes after which it was again transferred to the centrifuge and the liquid extracted to form a wet cake amounting to about 330 parts. The wet cake was spread on a pan and allowed to air dry. The resulting dry product had an amber color and was soft in texture. A portion of the dry product (2.75 gms.) was added to water (497.5 gms.) and the material attrited to form a gel containing approximately 0.55% of the collagen salt. A 5% solution of iodine in isopropanol was added in an amount (7.5 gms.) to provide about 14% iodine based on the weight of the microcrystalline collagen salt and the slurry mixed for another 10 minutes. The resulting gel had a dark amber color. The gel was spread on a polyethyleneterephthalate film and dried to form a coating having a thickness of about 3 mils. The resulting coating was clear but had a slight haze. When examined between crossed "Polaroids," it permitted the passage of a blue purple color.

EXAMPLE XII

A microcrystalline polyamide dispersion was formed in an aqueous formic acid solution in accordance with the method described in Pat. No. 3,299,011. The polyamide was a basic polyamide formed from adipic acid and equal parts of hexamethylene diamine and diethylene triamine. The microcrystalline product was of such nature that substantially all of the polyamide had a particle size not exceeding 0.5 micron and the dispersion contained about 20% solids. The dispersion was mixed with a 10% aqueous solutoin of polyvinyl alcohol in an amount to provide about 10% microcrystalline polyamide based on the weight of the polyvinyl alcohol. In order to form a homogeneous solution of the polyvinyl alcohol and a homogeneous suspension or dispersion of the microcrystalline polyamide particles in the solution, it was necessary to heat the solution to about 100° F. while the mixture was agitated over a period of several hours. The viscous mixture was subsequently cast to form a film having a thickness of about 5 mils. The film was subsequently stretched to a stretch ratio of about 2.5 in order to orient the film and the microcrystals.

Two samples of the film were laminated to a cellophane sheet to provide a structure such as illustrated in FIG. 4. The films were so arranged that the direction of orientation in the two films were at about right angles to each other to provide the stereoscopic ype film. The two exterior films are subsequently provided with dichroic dye images, the dispersed microcrystalline nylon serving as a fixation agent for the dyes and to increase the dye density and produce sharp well defined images. Direct cotton dyes are entirely satisfactory for this type film.

Similar results have been obtained by substituting microcrystalline cellulose, microcrystalline topochemical derivatives of cellulose (carboxymethyl and hydroxyethyl derivatives) and microcrystalline collagen for the microcrystalline polyamide.

In the foregoing example, the polarizing film consisted of oriented polyvinyl alcohol and the dispersed microcrystalline polyamide. From the foregoing disclosure, it is obvious that the transparent base film could be coated with the microcrystalline polymer dispersion without first forming a film containing a binder matrix such as polyvinyl alcohol. In order to obtain a high degree of orientation of the microcrystalline polymer, the opposite faces of the base film 6 as shown in FIG. 4 could be coated separately and the dispersion dried while maintaining the film in a strong magnetic field which would be directed at a 45° angle to the side edges of the base film. In coating the opposite side of the base film, the magnetic field would be at a 90° angle with respect to the line of the magnetic field used in coating the first face of the film. Where the microcrystalline coating is provided on opposite sides of the base film, it would be advantageous to apply a lacquer or the like after the desired images have been printed on the coatings so as to protect the oriented coatings in subsequent handling and use of the film.

The specific dichroic dyes which would be utilized for specific films would be dependent upon the specific microcrystalline polymer and the specific binder matrix where a binder matrix is utilized. In Example XII, where the polarizing film consists of the microcrystalline polyamide and a binder matrix of polyvinyl alcohol, direct cotton dyes are satisfactory. For the specific combination of materials of Example XII, examples of satisfactory dyes are Niagara Sky Blue (C.I. 518) and (C.I. 520), Solantine Red (C.I. 278), Solantine Pink (C.I. 353), Solantine Yellow (4GL) and Stilbene Yellow (C.I. 622).

From the foregoing specific examples, it is obvious that the present invention provides refracting structures from a wide range of polymer microcrystals. As illustrated by certain of the examples, the structure may be formed from a single type of polymer microcrystal or from a combination of specific polymer microcrystals. The combination of polymer microcrystals may be accomplished by dispersing microcrystals of two or more polymers in a single liquid medium or films of the two separate polymer microcrystals may be combined. In Example XI, a film containing an iodine complex is illustrated wherein the film-forming microcrystalline polymer was an iodine salt of collagen. Other of the polymer microcrystals may be substituted for the collagen. For example, a microcrystalline topochemical carboxymethyl derivative of amylose (D.S. —0.2) may be substituted for the bovine collagen of Example XI. The film formed from this specific material had a purple cast.

As pointed out hereinbefore, a high degree of orientation may be obtained by various specific methods. Where the refracting properties will be entirely dependent upon the polymer microcrystals, orientation also may be effected by a smearing or spreading operation which applies a high shear force to the gel. Because of the nature of the microcrystals, the polarizing refracting films are formed from a gel preferably having a high viscosity. The specific viscosity will vary depending upon the specific polymer microcrystals as well as the specific liquid suspending medium. The microcrystals will be homogeneously distributed in the liquid medium because of their colloidal nature and the dispersions or gels may be deposited on a suitable supporting surface and spread over the surface as by means of a doctor blade. The pressure and sliding action of the doctor blade will cause an orientation of the microcrystals. Where it is desired to form a relatively thick layer or coating, the first coating may be allowed to partially dry before application of an additional amount of the gel. The nature of the specific polymer microcrystals will dictate the concentration or the solids content of the gel. For example, in the case of the microcrystalline collagen salt, the solids content of the aqueous gel may vary up to about 1%. A gel of the microcrystalline topochemical derivatives of cellulose such as a carboxymethyl cellulose is preferably used at a concentration of about 10% in water. In the case of the microcrystalline polyamides dispersed in aqueous formic acid solutions, the gels preferably have a concentration of from 20 to 30%. In the case of the microcrystalline mineral silicates when incorporated in an aqueous solution of a polyvinyl alcohol, the mineral silicate may be used in amounts up to about 50% based on the weight of the polyvinyl alcohol and thus a 10% aqueous solution of polyvinyl alcohol would contain up to 5% of the microcrystalline mineral silicate.

We claim:
1. As an article of manufacture, a light polarizing film structure comprising rod-like discrete, anisotropic polymer microcrystals oriented with the long dimension of the rod-like microcrystals being parallel and said microcrystals being of colloidal size with a dimension of said rod-like microcrystals shorter than the wavelength of light to be polarized.

2. An article of manufacture as defined in claim 1 wherein the polymer microcrystals consist of microcrystalline cellulose.

3. An article of manufacture as defined in claim 1 wherein the polymer microcrystals consist of a microcrystalline topochemical cellulose derivative.

4. An article of manufacture as defined in claim 1 wherein the polymer microcrystals consist of microcrystalline collagen.

5. An article of manufacture as defined in claim 1 wherein the polymer microcrystals consist of a microcrystalline polyamide.

6. An article of manufacture as defined in claim 1 wherein the polymer microcrystals are disposed on a transparent supporting sheet.

7. An article of manufacture as defined in claim 1 wherein the polymer microcrystals are uniformly dispersed within a transparent supporting sheet.

8. A method of producing a light polarizing film structure which comprises forming a dispersion of rod-like discrete, anisotropic, polymer microcrystals of colloidal size with a dimension of said rod-like microcrystals shorter than the wavelength of light to be polarized in a non-solvent liquid medium, shaping the dispersion to form a sheet, orienting the microcrystals with the long dimension of said rod-like microcrystals being in parallel and volatilizing the liquid.

9. A method as defined in claim 8 wherein the non-solvent liquid medium comprises water.

10. A method as defined in claim 8 wherein the non-solvent liquid medium is an aqueous solution of polyvinyl alcohol.

References Cited

UNITED STATES PATENTS

| | | | |
|---|---|---|---|
| 2,978,446 | 4/1961 | Battista et al. | 260—212 |
| 3,251,824 | 5/1966 | Battista | 260—230 |
| 3,253,506 | 5/1966 | Marks et al. | 350—154 |
| 3,313,941 | 4/1967 | Marks | 350—147 |
| 3,350,982 | 11/1967 | Marks | 350—154 |
| 3,353,895 | 11/1967 | Emerson | 350—147X |

FOREIGN PATENTS

| | | | |
|---|---|---|---|
| 483,221 | 4/1938 | Great Britain | 350—154 |

DAVID SCHOENBERG, Primary Examiner

P. R. MILLER, Assistant Examiner

U.S. Cl. X.R.

350—154, 157